United States Patent Office 3,211,728
Patented Oct. 12, 1965

3,211,728
3-AMINO-6-HETEROCYCLIC AMINO AND 1 OR 2-LOWER ALKYL-3-AMINO-6-AMINO-PYRAZOLO PYRIMIDINES
Jean Druey, Riehen, Paul Schmidt, Therwil, and Kurt Eichenberger and Max Wilhelm, Basel, Switzerland, assignors to Ciba Corporation, New York, N.Y., a corporation of Delaware
No Drawing. Filed Apr. 18, 1962, Ser. No. 188,581
Claims priority, application Switzerland, Dec. 6, 1957, 53,512/57; Apr. 17, 1958, 58,421/58, 58,422/58; Mar. 26, 1959, 71,332/59, 71,333/59
10 Claims. (Cl. 260—247.5)

This is a continuation in part of our copending application Serial No. 12,927, filed March 7, 1960, and Serial No. 12,921, filed March 7, 1960, which themselves are continuation in part applications of our applications Serial No. 777,846, filed December 3, 1958, and Serial No. 777,859, filed December 3, 1958, respectively, now abandoned.

The present invention relates to new pyrazolo-pyrimidines. More especially it concerns 3-R-6-$R_1$-pyrazolo-[3,4-d]pyrimidines in which R represents a free or substituted hydroxyl or amino group, and $R_1$ a free or substituted amino group, and which pyrimidines are N-substituted in the pyrazole nucleus by a lower saturated hydrocarbon radical, and salts of these compounds.

The new compounds may contain further substituents, especially in the 4-position.

As saturated hydrocarbon radicals in 1- or 2-position there may be mentioned more particularly lower aliphatic hydrocarbon radicals, such as for example lower alkyl radicals, such as methyl, ethyl, propyl, butyl or amyl.

As substituents in the 4-position there come into consideration more especially lower alkyl radicals.

Another embodiment of the invention are the 4-unsubstituted 3-R-6-$R_1$-pyrazolo[3,4-d]pyrimidines N - unsubstituted in the pyrazole nucleus and their salts, in which R represents a free or substituted hydroxyl or amino group and $R_1$ an amino group which, preferably, is substituted.

In the compounds of the invention a substituted hydroxyl group is more especially an etherified hydroxyl group, such as a lower alkoxy group, for example methoxy, ethoxy or propoxy. As substituted amino groups there may be mentioned first of all aliphatically substituted amino groups, such as for example mono- or di-lower alkylamino groups, e.g. methylamino ethylamino, dimethylamino, diethylamino or dipropylamino or morpholino, piperidino, pyrrolidino or piperazino groups.

The new pyrazolo[3,4-d]pyrimidines have valuable properties. Furthermore they exhibit diuretic, coronary dilatating, central nervous system-inhibiting and antirheumatic effects. They are also effective in virus infections, for example in infections caused by ectromelia virus and against schistosoma. They are to be used as therapeutic agents or as intermediate products.

Quite especially valuable are the compounds of the formula

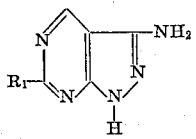

in which $R_1$ represents a free or, advantageously, a substituted amino group, for example a lower dialkylamino group, such as the dimethylamino or diethylamino group, and more especially 3-amino-6-dimethylamino-pyrazolo-[3,4-d]pyrimidine, and the compounds of the formula

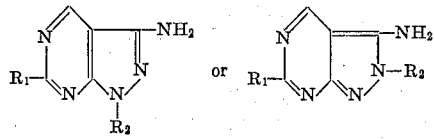

in which $R_2$ represents a lower alkyl radical, such as for example methyl, isopropyl or secondary butyl, and in which $R_1$ represents a free or substituted amino group, especially a lower dialkylamino group, such as the dimethylamino or diethylamino group, or a morpholino, piperidino, pyrrolidino or piperazino group and more especially 1- or 2-isopropyl-3-amino-6-dimethylamino-pyrazolo[3,4-d]pyrimidine.

The new compounds are obtained by reacting a corresponding pyrimidine, which contains in the 2-position the substituent $R_1$, in the 4-position an exchangeable group and in the 5-position a free, halogenated, esterified or amidated carboxyl group or nitrile group, with hydrazine or a monosubstituted hydrazine respectively directly or in stages.

The exchangeable group in 4-position is above all a group exchangeable for hydrazino group, such as a halogen atom such as chlorine or bromine.

The above mentioned reactions may be carried out in known manner in the presence or absence of a diluent or condensation agent, if desired at a raised temperature, in an open vessel or in a closed vessel under pressure.

In the resulting 3-R-pyrazolo[3,4-d]pyrimidines the substituent in the 3-position may be converted in the usual manner in conformity with the meaning of the symbol R. Further substituents may likewise be introduced in a manner known per se, converted or replaced by hydrogen.

More especially, free hydroxyl groups can be substituted in the usual manner, for example by lower alkyl radicals, e.g. methyl, ethyl or propyl. Insofar as the compounds obtained carry tautomerising hydrogen atoms, the latter can be replaced in the usual manner, for example by lower alkyl groups e.g. methyl, ethyl or propyl.

The introduction of organic radicals into hydroxyl groups or into the ring nitrogen atoms can advantageously be effected by reaction with reactive esters of the corresponding alcohols, especially those of hydrohalic acids, sulfuric acids, or organic sulfonic acids, for example benzene-sulfonic acid, advantageously in the presence of a condensing agent or with the use of metal salts of the pyrazolo-pyrimidines.

The above conversions in the resulting pyrazolo-pyrimidines can be carried out singly or in combination.

The invention also comprises such modifications of the process wherein a compound obtained as intermediate product at any stage in the process is used as starting material and the remaining process steps are carried out, or wherein the process is interrupted at any stage, or process modifications in which the reaction components are formed under the conditions of the reaction.

As starting materials and reaction components there are used more especially those which will yield the end products mentioned above. The starting materials, insofar as they are new, can be made by methods in themselves known.

The pyrimidines used as starting materials may be obtained for instance, by condensation of a suitable substituted amidine with a malonic acid carrying a carbonyl group, if desired in the form of a functional acid and/or carbonyl derivative, and, if desired, with suitable modification of substituents in the resulting pyrimidines. Thus, for example, an S-alkyl-isothiourea is reacted with α- ethoxy-methylene-α-cyanacetic acid ethyl ester to 2-alkyl-mercapto-4-hydroxy-5-cyano-pyrimidine, in which the substituents may be changed in the customary and suitable manner.

According to a preferred form of carrying out the process a 2-R₁-4-chloro-5-cyanopyrimidine is obtained from 2-methylmercapto-4-hydroxy-5-cyanopyrimidine by reaction with an amine of the formula R₁H and treatment with phosphorus oxychloride, then converted with a corresponding hydrazine to the desired 3-amino-6-R₁-pyrazolo[3,4-d]pyrimidine.

Depending on the substituents present in the products of the process different salts may be prepared. Thus, when they contain free hydroxyl groups metal salts can be obtained, for example, by solution in alkali lyes. Compounds of a basic character form salts with inorganic or organic acids. As salt-forming acids there come into consideration for example such as form therapeutically acceptable salts e.g. hydrohalic acids, sulfuric acids, phosphoric acids, nitric acid, perchloric acid; aliphatic, alicyclic, aromatic or heterocyclic carboxylic or sulfonic acids, such as formic, acetic, propionic, oxalic, succinic, glycolic, lactic, malic, tartaric, citric, ascorbic, hydroxymaleic, dihydroxymaleic or pyruvic acid; phenylacetic, benzoic, para-aminobenzoic, anthranilic, para-hydroxybenzoic, salicyclic, or para-aminosalicyclic acid; methane - sulfonic, ethane-sulfonic, hydroxyethane - sulfonic, ethylene-sulfonic acid; toluene-sulfonic, naphthalene-sulfonic acids or sulfanilic acid; methionine, tryptophane, lysine or arginine.

The above described pyrazolo-pyrimidines, their salts or corresponding mixtures can be used, for example, in the form of pharmaceutical preparations. These preparations contain the said compounds in admixture with pharmaceutical organic or inorganic carriers suitable for enteral, parenteral or topical application. As carriers there come into consideration such materials as do not react with the pyrazolo-pyrimidine compounds as, for example, water, gelatine, lactose, starches, magnesium stearate, talc, vegetable oils, benyl alcohols, gums, polyalkylene glycols, cholesterol or other known excipients. The pharmaceutical preparations may be made up, for example, as tablets, dragees, or in liquid form as solutions, suspensions of emulsions. If desired, they can be sterilised and/or may contain auxiliary substances, such as preserving agents, stabilizing agents, wetting agents or emulsifying agents. They may also contain other therapeutically useful substances. The preparations may be made according to customary methods.

The following examples illustrates the invention:

Example 1

8.3 grams of 2-dimethylamino-4-chloro-5-cyanopyrimidine are treated with a solution of 4.6 grams of hydrazine in 100 cc. of ethanol. The solution is heated for 1 hour at the boil. After cooling, the precipitated crystalline product is filtered with suction, introduced into alcoholic hydrochloric acid, heated again for 1 hour and allowed to cool. The precipitated product is filtered with suction and recrystallized from ethanol. The hydrochloride of 3-amino-6-dimethylamino pyrazolo[3,4-d]-pyrimidine of the formula

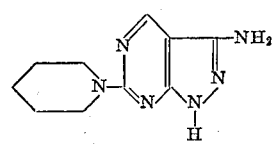

is obtained in the form of yellow crystals melting at 267–269° C. (with decomposition).

The 2-dimethylamino-4-chloro-5-cyanopyrimidine used as starting material is obtained as follows:

11.2 grams of potassium hydroxide and 70 cc. of methanol are cooled to 0° C. and then a solution of 44 grams of S-methyl-isothioureahydriodide in 200 cc. of methanol is added. The precipitated potassium iodide is suction-filtered, 33 grams of ethoxymethylene-cyanacetic ester are added to the filtrate, the temperature being maintained between 8 and 12° C., the yellow precipitate is filtered and washed with cold methanol and ether. The resulting S-methyl-isothioureido - methylene - cyanacetic ester melts at 128–129° C.

20 cc. of 0.5 N-sodium hydroxide solution are added to 2.1 grams of S-methyl-isothioureido-methylene-cyanacetic ester and heated for 10 minutes at 50° C. (change in color of the solution from yellow to white). A small quantity of undissolved material is immediately filtered off, the filtrate adjusted to pH=1 with 1 N-hydrochloric acid and the precipitate formed suction-filtered. The product is recrystallized from a large quantity of boiling ethanol. There is obtained 2-methylmercapto-4-hydroxy-5-cyanopyrimidine of the formula

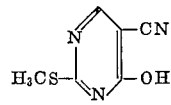

in the form of white crystals melting at 220–222° C.

60 grams of 2-methylmercapto-4-hydroxy-5-cyanopyrimidine are heated with 80 cc. of liquid dimethylamine in a closed tube for 6 hours at 90–100° C. After evaporating the excess dimethylamine, the residue is taken up in water. A small quantity of undissolved material is suction-filtered, the filtrate adjusted to pH=7 with 2 N-hydrochloric acid and suction-filtered again. By recrystallization from a large quantity of ethanol there is obtained 2-dimethylamino-4-hydroxy-5-cyanopyrimidine of the formula

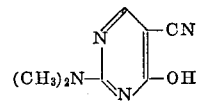

in the form of white crystals melting at 294–296° C.

13 grams of 2-dimethylamino-4-hydroxy-5-cyanopyrimidine are heated with 60 cc. of phosphorus oxychloride for 2 hours in a bath at 110° C. After evaporating the phosphorus oxychloride, the residue is introduced into ice-water, its pH adjusted to 8 with 2 N-sodium hydroxide solution, and the reaction product extracted with chloroform. There is obtained 2-dimethyl-amino-4-chloro-5-cyanopyrimidine of the formula

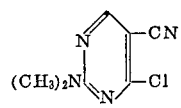

in the form of yellow crystals melting at 149–150° C.

Example 2

5 grams of 2-piperidino-4-chloro - 5-cyanopyrimidine and 10 grams of hydrazine in 75 cc. of ethanol are boiled under reflux for 3 hours. The alcohol is evaporated in vacuo and the residue is dissolved in 50 cc. of 2 N-hydrochloric acid. The aqueous solution is filtered and rendered alkaline with 2 N-sodium hydroxide solution. The white precipitate is filtered off and recrystallized from alcohol. There is obtained 3-amino-6-piperidinopyrazolo[3,4-d]pyrimidine of the formula

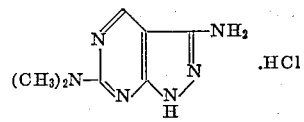

melting at 281° C.

The 2-piperidino-4-chloro-5-cyano-pyrimidine used as starting material can be prepared by the following method:

A mixture of 10 grams of 2-methylmercapto-4-hydroxy-5-cyanopyrimidine and 20 grams of piperidine in 20 cc. of ethanol is refluxed for 10 hours. The alcohol is removed under reduced pressure, and the residue is dissolved in 100 cc. of warm water. The addition of 2 N-acetic acid precipitates 2-piperidino-4-hydroxy-5-cyanopyrimidine of the formula

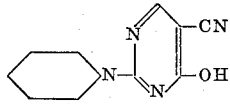

which, after having been recrystallized from alcohol, melts at 266° C.

A mixture of 10 grams of 2-piperidino-4-hydroxy-5-cyanopyrimidine and 100 cc. of phosphorus oxychloride is heated for 2 hours at the boil. The excess phosphorus oxychloride is removed in vacuo, and the residue is dissolved in chloroform and extracted first with a saturated solution of sodium bicarbonate and then with water. The chloroformic solution is dried over sodium sulfate and evaporated in vacuo. Recrystallization of the residue from a mixture of benzene and petroleum ether yields crystalline 2-piperidino-4-chloro-5-cyanopyrimidine of the formula

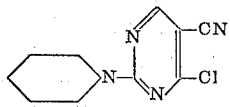

melting at 115° C.

Example 3

A solution of 5 grams of 2-morpholino-4-chloro-5-cyanopyrimidine and 10 grams of hydrazine in 75 cc. of ethanol is refluxed for 6 hours. The solvent is evaporated, and the residue is dissolved in 30 cc. of 2 N-hydrochloric acid, and undissolved constituents are removed by filtration. By adding to the filtered solution 10 N-sodium hydroxide solution a white precipitate is formed, which is recrystallized from a large amount of ethanol. There is obtained 3-amino-6-morpholino-pyrazolo[3,4-d]pyrimidine of the formula

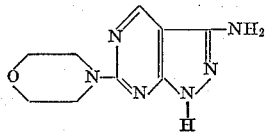

in the form of crystals melting at 282° C.

The 2-morpholino-4-chloro-5-cyanopyrimidine, used as starting material, can be prepared in the following manner:

30 grams of 2-methylmercapto-4-hydroxy-5-cyanopyrimidine and 50 grams of morpholine in 30 cc. of ethanol are heated at the boil for 7 hours. The ethanol is evaporated and the residue is dissolved in 50 cc. of hot water and acidified with 2 N-acetic acid. The precipitate formed is recrystallized from water, to yield 2-morpholino-4-hydroxy-5-cyanopyrimidine of the formula

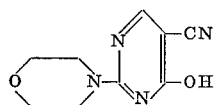

in white crystals melting at 275–276° C.

25 grams of 2-morpholino-4-hydroxy-5-cyanopyrimidine are boiled with 400 cc. of phosphorus oxychloride for 2 hours. The phosphorus oxychloride is evaporated, the residue is dissolved in chloroform, and the solution is extracted with sodium bicarbonate solution and then with water. The chloroformic solution is dried over sodium sulfate and the solvent is distilled off. A solid residue is obtained which is recrystallized from a mixture of benzene and petroleum ether, to yield crystalline 2-morpholino-4-chloro-5-cyanopyrimidine of the formula

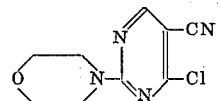

melting at 170° C.

Example 4

A solution of 9 grams of 2-dimethylamino-4-chloro-5-cyanopyrimidine and 22 grams of isopropyl-hydrazine in 150 cc. of ethanol is refluxed for 5 hours. The solution is then evaporated to dryness in vacuo, mixed with 50 cc. of water, adjusted to pH=10 with 2 N-sodium hydroxide solution and the precipitate formed is filtered with suction, it is then recrystallized from petroleum ether. 1- or 2-isopropyl-3-amino-6-dimethylamino-pyrazolo [3,4-d] pyrimidine of the formula

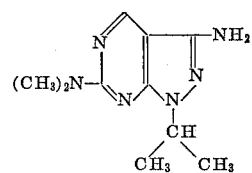

or

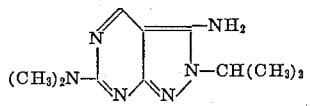

is obtained in yellow crystals melting at 147–149° C. The hydrochloride, melting at 254–255° C., crystallizes from ethanolic hydrochloric acid.

Example 5

A solution of 5 grams of 2-piperidino-4-chloro-5-cyanopyrimidine in 75 cc. of ethanol is mixed with 10 grams of methylhydrazine and the mixture is refluxed for 3 hours. The alcohol is evaporated and the residue dissolved in 2 N-hydrochloric acid and filtered off. Addition of 2 N-sodium hydroxide solution precipitates the 1-methyl-3-amino-6-piperidino-pyrazolo[3,4-d]pyrimidine of the formula

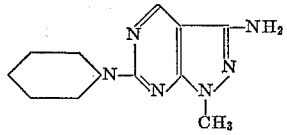

which, after recrystallization from ethanol, melts at 163° C.

Example 6

A solution of 5 grams of 2-piperidino-4-chloro-5-cyanopyrimidine and 10 grams of isopropylhydrazine in 50 cc. of ethanol is refluxed for 3 hours. The solvent is evaporated in vacuo and the residue dissolved in 50 cc. of 5 N-hydrochloric acid. When the filtered solution is treated with 10 N-sodium hydroxide solution, 1-isopropyl-3-amino-6-pyridino-pyrazolo[3,4-d]pyrimidine of the formula

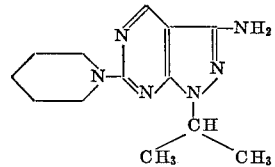

precipitates in pale-yellow crystals which melt at 144° C. after recrystallization from ethanol.

Example 7

A solution of 5 grams of 2-morpholino-4-chloro-5-cyanopyrimidine and 10 grams of methylhydrazine in 75 cc. of ethanol is heated at the boil for 6 hours and the solvent is then expelled in vacuo. The residue is dissolved in 25 cc. of 5 N-hydrochloric acid and the solution is filtered. Addition of 5 N-sodium hydroxide solution produces a yellow precipitate which is filtered off and recrystallized from ethanol, to yield crystalline 1-methyl-3-amino-6-morpholino-pyrazolo[3,4-d]pyrimidine of the formula

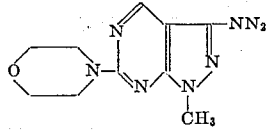

melting at 213° C.

Example 8

A solution of 9 grams of 2-dimethylamino-4-chloro-5-cyanopyrimidine and 10.2 grams of pentyl-(2)-hydrazine in 15 cc. of ethanol is refluxed for 5 hours. The reaction mixture is evaporated in vacuo, the residue is treated with 60 cc. of water, adjusted with 2 N-sodium hydroxide solution to pH=10 and extracted with chloroform. After evaporating the chloroform, an oil is obtained which is extracted with a small amount of isopropyl ether. A small amount of a solid product, which is insoluble in isopropyl ether, remains behind which is recrystallized from ethyl acetate, to yield 2-pentyl-(2')-3-amino-6-dimethylamino-pyrazolo[3,4-d]pyrimidine of the formula

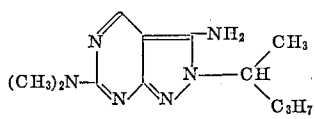

in colorless crystals melting at 217–218° C.

The isopropyl ether extract is kept for some time in the cold, whereupon a solid product separates out which is recrystallized from cyclohexane, to yield 1-pentyl-(2')-3-amino-6-dimethylaminopyrazolo[3,4-d]pyrimidine of the formula

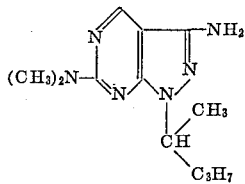

is colorless crystals melting at 110–111° C.

What is claimed is:
1. A member selected from the group consisting of a compound of the formula

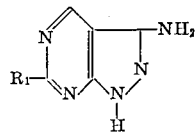

in which $R_1$ represents a member selected from the group consisting of morpholino, piperidino, pyrrolidino and piperazino, and a therapeutically useful acid addition salt thereof.

2. A member selected from the group consisting of pyrazolo pyrimidines of the formulae

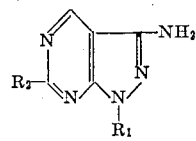

and

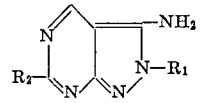

and their therapeutically useful acid addition salts, in which $R_1$ stands for a lower alkyl radical and $R_2$ for a member selected from the group consisting of amino, mono-lower alkylamino, di-lower alkylamino, morpholino, piperidino, pyrrolidino and piperazino.

3. 1-isopropyl - 3 - amino - 6 - dimethylamino-pyrazolo [3,4-d]pyrimidine.
4. 1-methyl - 3 - amino-6-piperidino-pyrazolo[3,4-d] pyrimidine.
5. 1-isopropyl-3-amino - 6 - piperidino-pyrazolo[3,4-d] pyrimidine.
6. 1-methyl-3-amino-6-morpholino - pyrabolo[3,4 - d] pyrimidine.
7. 1-pentyl-(2')-3-amino - 6 - dimethylamino-pyrazolo [3,4-d]pyrimidine.
8. 2-pentyl - (2') - 3-amino-6-dimethylamino-pyrazolo [3,4-d]pyrimidine.
9. 3 - amino - 6 - piperidino-pyrazolo[3,4-d]pyrimidine.
10. 3 - amino - 6 - morpholino-pyrazolo[3,4-d]pyrimidine.

References Cited by the Examiner
UNITED STATES PATENTS
2,770,628   11/56   Bortnick et al. _____ 260—309.7

FOREIGN PATENTS
716,327   10/54   Great Britain.

NICHOLAS S. RIZZO, *Primary Examiner.*
WALTER A. MODANCE, *Examiner.*

UNITED STATES PATENT OFFICE
CERTIFICATE OF CORRECTION

Patent No. 3,211,728　　　　　　　　　　　　　　October 12, 1965

Jean Druey et al.

It is hereby certified that error appears in the above numbered patent requiring correction and that the said Letters Patent should read as corrected below.

Column 8, lines 1 to 6, the formula should appear as shown below instead of as in the patent:

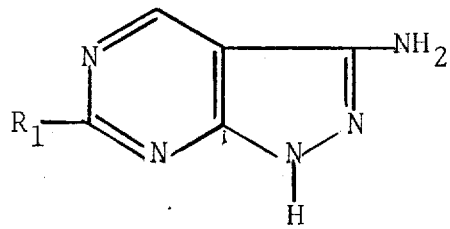

same column 8, line 37, for "-pyrabolo" read -- -pyrazolo --.

Signed and sealed this 21st day of June 1966.

(SEAL)
Attest:

ERNEST W. SWIDER　　　　　　　　　　　　　　　　EDWARD J. BRENNER
Attesting Officer　　　　　　　　　　　　　　　Commissioner of Patents